(12) United States Patent
Zhang et al.

(10) Patent No.: US 7,346,621 B2
(45) Date of Patent: Mar. 18, 2008

(54) METHOD AND SYSTEM FOR RANKING OBJECTS BASED ON INTRA-TYPE AND INTER-TYPE RELATIONSHIPS

(75) Inventors: Benyu Zhang, Beijing (CN); Hua-Jun Zeng, Beijing (CN); Wei-Ying Ma, Beijing (CN); Wensi Xi, Beijing (CN); Zheng Chen, Beijing (CN); Edward A. Fox, Blacksburg, VA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 10/846,835

(22) Filed: May 14, 2004

(65) Prior Publication Data
US 2005/0256832 A1    Nov. 17, 2005

(51) Int. Cl.
*G06F 17/30* (2006.01)
(52) U.S. Cl. ................ 707/100; 707/101; 707/102
(58) Field of Classification Search ............ None
See application file for complete search history.

(56) References Cited

U.S. PATENT DOCUMENTS

| 6,601,075 B1 * | 7/2003 | Huang et al. ............ 707/104.1 |
| 7,003,519 B1 * | 2/2006 | Biettron et al. ................ 707/6 |
| 2005/0256832 A1 | 11/2005 | Zhang et al. |

OTHER PUBLICATIONS

Dhyani, Devanshu et al., "A Survey of Web Metrics," ACM Computing Surveys, vol. 34, No. 4, Dec. 2002 (35 pages).

U.S. Appl. No. 11/130,803, filed May 16, 2005, Zhang et al.
Chen, Zheng et al., "A Unified Framework for Web Link Analysis," Department of Computer Science, City University of Hong Kong, 1999 (8 pages).
Baeza-Yates, Ricardo et al., "Web Structure, Dynamics and Page Quality," Lecture Notes in Computer Science, Proceedings of the 9th International Symposium on String Processing and Information Retrieval, vol. 2476, Sep. 2002, pp. 117-130.
Bharat, Krishna and Monika R. Henzinger, "Improved Algorithms for Topic Distillation in a Hyperlinked Environment," Proceedings of the 21st Annual International ACM-SIGIR Conference on Research and Development in Information Retrieval, Australia, 1998, 9 pages.
Brin, Sergey and Lawrence Page, "The Anatomy of a Large-Scale Hypertextual Web Search Engine," Computer Networks and ISDN Systems, vol. 30, 1998, 25 pages.
Callan, James P., "Passage-Level Evidence in Document Retrieval," Proceedings of the 17th Annual International ACM SIGIR Conference on Research and Development in Information Retrieval, Jul. 1994, Ireland, 9 pages.

(Continued)

*Primary Examiner*—Jeffrey Gaffin
*Assistant Examiner*—Tomasz Ponikiewski
(74) *Attorney, Agent, or Firm*—Perkins Coie LLP

(57) ABSTRACT

A method and system for ranking objects based on relationships with objects of a different object type is provided. The ranking system defines an equation for each attribute of each type of object. The equations define the attribute values and are based on relationships between the attribute and the attributes associated with the same type of object and different types of objects. The ranking system iteratively calculates the attribute values for the objects using the equations until the attribute values converge on a solution. The ranking system then ranks objects based on attribute values.

35 Claims, 4 Drawing Sheets

OTHER PUBLICATIONS

Chakrabarti, Soumen et al., "Automatic Resource Compilation by Analyzing Hyperlink Structure and Associated Text," Proceedings of the 7th International World Wide Web, 1998, 13 pages.

Chakrabarti, Soumen et al., "Mining the Web's Link Structure," Computer, Aug. 1999, © 1999 IEEE, pp. 60-67.

Chakrabarti, Soumen, Mukul Joshi and Vivek Tawde, "Enhanced Topic Distillation using Text, Markup Tags, and Hyperlinks," In Proceedings of the 24th Annual International ACM SIGIR Conference on Research and Development in Information Retrieval, New Orleans, 2001, © ACM, pp. 208-216.

Chen, Jinlin et al., "Function-Based Object Model Towards Website Adaption," In Proceedings of the 10th International World Wide Web Conference, China, May 2001, pp. 587-596.

Cohn, David and Huan Chang, "Learning to Probabilistically Identify Authoritative Documents," 17th International Conference on Machine Learning, (Stanford 2000), pp. 167-174.

Craswell, Nick and David Hawking, "Overview of the TREC-2002 Web Track," 11th Text Retrieval Conference, Maryland 2002, pp. 1-10.

Craswell, Nick, David Hawking and Stephen Robertson, "Effective Site Finding using Link Anchor Information," 24th Annual International ACM SIGIR Conference on Research and Development in Information Retrieval, 2001, New Orleans, © ACM, pp. 250-257.

Davison, Brian, D., "Toward a Unification of Text and Link Analysis," SIGIR '03, Toronto, Canada, 2003, 2 pages.

Embley, D.W., Y. Jiang and Y.-K Ng, "Record-boundary discovery in Web documents," In Proceedings of the 1999 ACM SIGMOD International Conference on Management of Data, Philadelphia, 1999, pp. 467-478.

European Search Report for European Patent Application No. 05104033.5, Microsoft Corporation, Sep. 20, 2005.

Fan, Weiguo, Michael D. Gordon and Praveen Pathak, "A generic ranking function discovery framework by genetic programming for information retrieval," Information Processing and Management, © 2003 Published by Elsevier Ltd., 16 pages.

Fiore, Andrew T., Scott Lee Teirnan and Marc A. Smith, "Observed Behavior and Perceived Value of Authors in Usenet Newsgroups: Bridging the Gap," In Proceedings of the CHI 2002 Conference on Human Factors in Computing Systems, Minnesota, 2002, vol. No. 4, Issue No. 1, © 2002 ACM, pp. 323-330.

Fujita, Sumio, "More Reflections on 'Aboutness' TREC-2001 Evaluation Experiments at Justsystems," In Proceedings of the Tenth Retrieval Conference (TREC 2001), Maryland, NIST Special Publication 500-250, 2002, 8 pages.

Garfield, Eugene, "Citation Analysis as a Tool in Journal Evaluation," Essays of an Information Scientists, vol. 1, 1962-1973, pp. 527-544.

Gey, Fredric C. et al., "Logistic regression at TREC4: Probabilistic Retrieval from Full Text Document Collections," In Proceedings of the 4th Text Retrieval Conference (TREC 4), Maryland, NIST Special Publication 500-236, 1996, 8 pages.

Gu, Xiao-Dong et al., "Visual Based Content Understanding towards Web Adaptation," In Proceedings of Second International Conference on Adaptive Hypermedia and Adaptive Web-based Systems, Spain, 2002, 10 pages.

Haveliwala, Taher H., "Topic-Sensitive PageRank: A Context-Sensitive Ranking Algorithm for Web Search," IEEE Transactions on Knowledge and Data Engineering, Jul./Aug. 2003, vol. 15, No. 4, © 2003 IEEE, pp. 784-796.

Hearst, Marti A. and Christian Plaunt, "Subtopic Structuring for Full-Length Document Access," In Proceedings of the 16th Annual International ACM SIGIR Conference on Research and Development in Information Retrieval, Pittsburgh, 1993, pp. 1-10.

Herlocker, Jonathan L. et al., "An Algorithmic Framework for Performing Collaborative Filtering," 22nd annual international ACM SIGIR Conference on Research and Development in Information Retrieval, Berkley, 1999, pp. 230-237.

Kazai, Gabriella, Mounia Lalmas and Thomas Rolleke, "A Model for the Representation and Focussed Retrieval of Structured Documents based on Fuzzy Aggregation," In Proceedings of the 8th International Symposium on String Processing and Information Retrieval, Chile, 2001, pp. 1-18.

Kerschberg, Larry et al., "A Semantic Taxonomy-Based Personalizable Meta-Search Agent," Proceedings of the Second International Conference on Web Information Systems Engineering, Japan, Dec. 2001, © 2002 IEEE, pp. 41-50.

Kleinberg, Jon M., "Authoritative Sources in a Hyperlinked Environment," Journal of the ACM, vol. 46, No. 5, Sep. 1999, © 1999 ACM, pp. 604-632.

Lee, Joon Ho, "Analyses of Multiple Evidence Combination," In Proceedings of the 20th Annual International ACM SIGIR Conference on Research and Development in Information Retrieval, Pennsylvania, 1997, pp. 1-15.

Lee, Joon Ho, "Combining Multiple Evidence from Different Properties of Weighting Schemes," In Proceedings of the 18th Annual International ACM SIGIR Conference on Research and Development in Information Retrieval, Seattle, 1995, pp. 180-188.

Lempel, R. and S. Moran, "SALSA: The Stochastic Approach for Link-Structure Analysis," ACM Transactions on Information Systems, vol. 19, No. 2, Apr. 2001, © 2001 ACM, pp. 131-160.

Lewis, David D., "Applying Support Vector Machines to the TREC-2001 Batch Filtering and Routing Tasks," In Proceedings of the 10th Text Retrieval Conference, Maryland, NIST Special Publication 500-250, 7 pages.

Miller, Joel C., Gregory Rae and Fred Schaefer, "Modifications of Kleinberg's HITS Algorithm Using Matrix Exponentiation and Web Log Records," SIGIR'01, New Orleans, © 2001 ACM, pp. 444-445.

Mittendorf, Elke and Peter Schauble, "Document and Passage Retrieval Based on Hidden Markov Models," In Proceedings of the 17th Annual International ACM SIGIR Conference on Research and Development in Information Retrieval, Ireland, 1994, pp. 318-327.

Moffat, Alistair et al., "Retrieval of Partial Documents," In Proceedings of the Second Text Retrieval Conference (TREC-2), NIST Special Publication 500-215, 1994, 11 pages.

NG, Andrew Y., et al., "Stable Algorithms for Link Analysis," SIGIR 2001, New Orleans, Louisiana, © 2001 ACM, 9 pages.

Ogilvie, Paul and Jamie Callan, "Combining Document Representations for Known-Item Search," In Proceedings of the 26th Annual International ACM SIGIR Conference on Research and Development Information Retrieval, 2003, Canada, © 2003 ACM, pp. 143-150.

Pinski, Gabriel and Francis Narin, "Citation Influence for Journal Aggregates of Scientific Publications: Theory, with Application to the Literature of Physics," Information Processing & Management, vol. 12, No. 5, Pergamon Press 1976, pp. 297-312.

Robertson, S.E., "Overview of the Okapi Projects," Journal of Documentation, vol. 53, No. 1, Jan. 1997, pp. 3-7.

Salton, Gerald, J. Allan and C. Buckley, "Approaches to Passage Retrieval in Full Text Information Systems," In Proceedings of the 16th Annual International ACM SIGIR Conference on Research and Development in Information Retrieval, Pennsylvania, © 1993 ACM, pp. 49-58.

Shaw, Joseph A. and Edward A. Fox, "Combination of Multiple Searches," In Proceedings of the 3rd Text Retrieval Conference (TREC-3) Maryland, NIST Special Publication 500-250, 1995, 4 pages.

Theobald, Martin and Klas, Claus-Peter, "Bingol and Daffodil: Personalized Exploration of Digital Libraries and Web Sources," Proceedings of the International World Wide Web Conference, Budapest, Hungary, May 20, 2003, 20 pages.

Tomlin, John A., "A New Paradigm for Ranking Pages on the World Wide Web," Proceedings of the International World Wide Web Conference, Budapest, Hungary, May 2003, pp. 350-355.

Vogt, Christopher C. and Garrison W. Cottrell, "Fusion Via Linear Combination for the Routing Problem," In Proceedings of the 6th Text Retrieval Conference (TREC 2001), NIST Special Publication 500-250, 2002, pp. 1-5.

Vogt, Christopher C. and Garrison W. Cottrell, "Predicting the Performance of Linearly Combined IR Systems," 21st Annual International ACM SIGIR Conference on Research and Development in Information Retrieval, Australia, Aug. 1998, pp. 1-7.

Wang, Ke and Ming-Yen Thomas Su, "Item Selection By 'Hub-Authority,' Profit Ranking," Proceedings of the 8th ACM SIGKDD International Conference on Knowledge Discovery and Data Mining, Edmonton, Canada, Jul. 2002, © 2002 ACM, pp. 652-657.

Wen, Ji-Rong et al., "Query Clustering Using User Logs," ACM Transactions on Information Systems, vol. 20, No. 1, Jan. 2002, pp. 59-81.

Xi, Wensi and Edward A. Fox, "Machine Learning Approach for Homepage Finding Task," In Proceedings of the 10th Text Retrieval Conference (TREC 2001), Maryland, NIST Special Publication 500-250, 2002, 12 pages.

Xi, Wensi., "Combining Multiple Source of Evidence for Information Retrieval," Master Thesis, Nanyang Technological University, Singapore, Jul. 2000, 85 pages.

Xu, Jinxi and W.Bruce Croft, "Query Expansion Using Local and Global Document Analysis," In Proceedings of ACM-SIGIR Conference on Research and Development in Information Retrieval, Switzerland, 1996, 8 pages.

Yu, Shipeng et al., "Improving Pseudo-Relevance Feedback in Web Information Retrieval Using Web Page Segmentation," In Proceeding of the 12th World Wide Web conference, Hungary, 2003, pp. 11-18.

Zobel, Justin et al., "Efficient Retrieval of Partial Documents," Information Processing & Management, vol. 31 (3), 1995, pp. 1-21.

* cited by examiner

METHOD AND SYSTEM FOR RANKING OBJECTS BASED ON INTRA-TYPE AND INTER-TYPE RELATIONSHIPS

TECHNICAL FIELD

The described technology relates generally to ranking of objects and particularly to ranking based on object relationships.

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, a search engine service may maintain a mapping of keywords to web pages. The search engine service may generate this mapping by "crawling" the web (i.e., the World Wide Web) to extract the keywords of each web page. To crawl the web, a search engine service may use a list of root web pages and identify all web pages that are accessible through those root web pages. The keywords of any particular web page can be extracted using various well-known information retrieval techniques, such as identifying the words of a headline, the words supplied in the metadata of the web page, the words that are highlighted, and so on. The search engine service may calculate a relevance score that indicates how relevant each web page is to the search request based on the closeness of each match, web page popularity (e.g., Google's PageRank), and so on. The search engine service then displays to the user the links to those web pages in an order that is based on their relevance. Search engines may more generally provide searching for information in any collection of documents. For example, the collections of documents could include all U.S. patents, all federal court opinions, all archived documents of a company, and so on.

Two well-known techniques for ranking web pages are PageRank and HITS ("Hyperlinked-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \sum_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." Hub is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the results as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q) \text{ and } h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of web logs, $b_{ij}$ of the adjacency matrix can be increased whenever a user travels from web page i to web page j.

These web page ranking techniques base their rankings primarily on attributes of the web pages themselves. These attributes include links from one web page to another and travels from one web page to another. The ranking techniques fail to factor in attributes that are not directly related to web pages. For example, the importance of a web page might more accurately be determined when the expertise of users who access the web page is factored in. It would be desirable to have a technique for calculating the importance of web pages based on attributes that are not directly related to web pages. More generally, it would be desirable to generate a score for an object of one type (e.g., web pages) based on relationships to objects of another type (e.g., users).

SUMMARY

A method and system for ranking objects based on relationships with objects of a different object type is provided. The ranking system defines an equation for each attribute of each type of object. The equations define the attribute values and are based on relationships between the attribute and the attributes associated with the same type of object and different types of objects. Since the attribute values may be inter-dependent that is one attribute may be defined in terms of another attribute and vice versa, the equations represent a recursive definition of the attributes. The ranking system iteratively calculates the attribute values for the objects using the equations until the attribute values converge on a solution. The ranking system then ranks objects based on attribute values.

DETAILED DESCRIPTION

Figure 1:
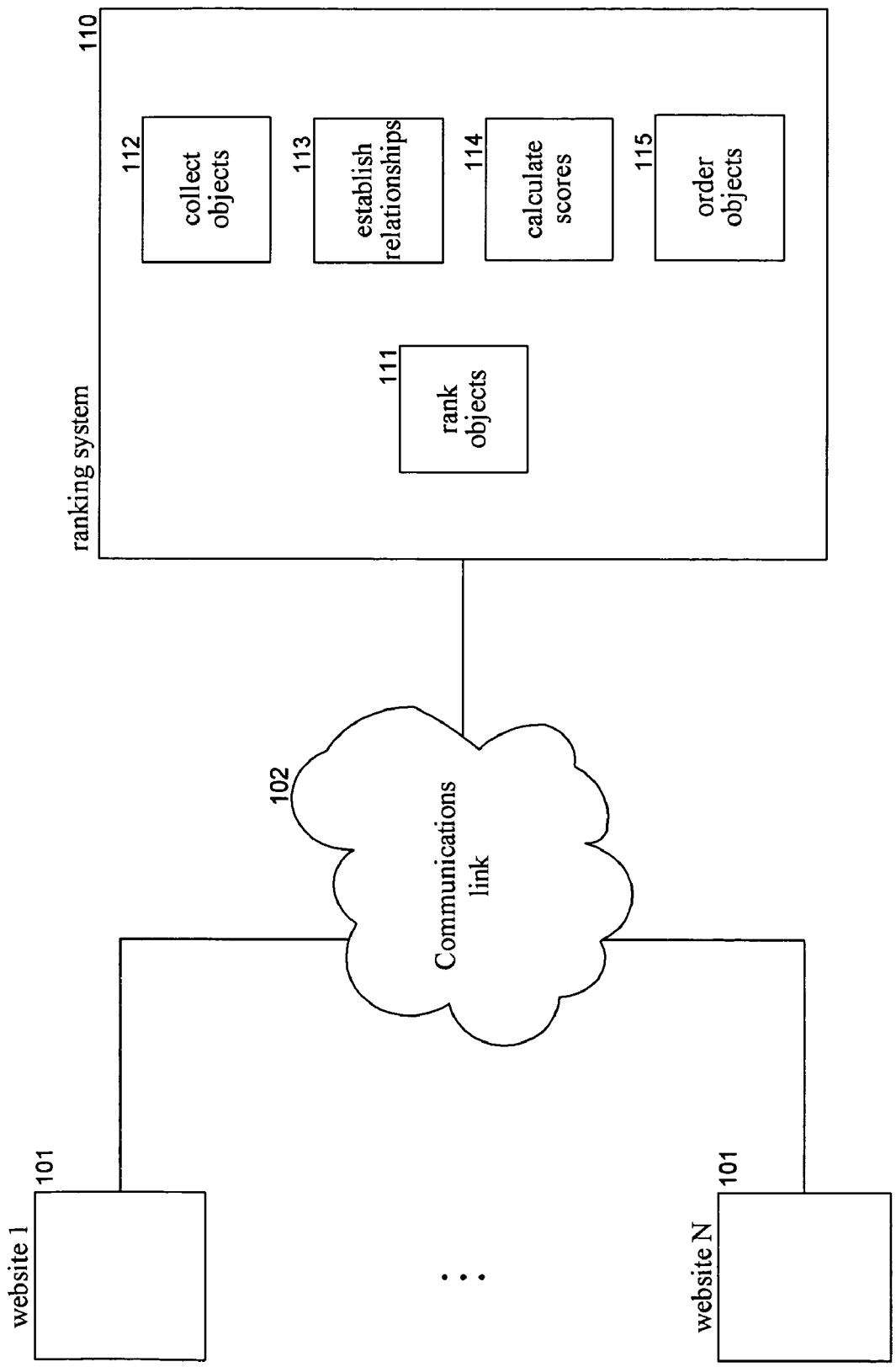
FIG. 1 is a flow diagram that illustrates components of the ranking system in one embodiment.

A method and system for ranking data objects of one data object type based on relationships with data objects of the same or another data object type is provided. In one embodiment, the ranking system identifies data objects of various data object types. For example, one data object type may be web pages, another data object type may be queries, and another data object type may be users. Each data object type may have various type-specific attributes. For example, a web page may have an authority attribute, and a user may have an expertise attribute. The authority attribute of the web page may be based on the number of incoming links of that web page. The expertise attribute of a user may be increased when the user accesses web pages that have high authority attribute values. The ranking system calculates attribute values for the data objects and may rank the data objects based on their attribute values.

The ranking system defines "types" of objects such that each object contains a single attribute. For example, the ranking system may define a type corresponding to the authority attribute of a web page and another type corresponding to the hub attribute of a web page. Thus, two types can represent the same underlying data objects (e.g., web pages). The ranking system determines various relationships between objects of the same type, referred to as intra-type relationships, and between objects of different types, referred to as inter-type relationships. For example, when a query is submitted, the ranking system may use the results as the objects of the authority type and may use web logs to identify users who have accessed those web pages as objects of the expertise type. The intra-type relationships objects of the authority type may include incoming link and outgoing link relationships of web pages. For example, if a web page has a link to another web page, then that web page has an outgoing link relationship to the other web page and the other web page has an incoming link relationship to that web page. The inter-type relationships between object of an authority type and an expertise type may be based on user access to web pages. For example, if a user accesses a web page, then that web page and user have an access relationship. The ranking system derives values for attributes for objects of a certain type using intra-type relationships and using inter-type relationships combined with the attribute values of objects of other types. For example, the ranking system may use the incoming and outgoing link relationships and the user access relationships to derive the authority and hub attributes of web pages and the expertise attribute of users.

In one embodiment, the ranking system represents the relationships and attributes using a set of equations, such as linear equations. The ranking system represents the attribute values of each type using a linear equation that may be recursively defined based on attribute values of another type. For example, a linear equation for the authority attribute may be defined based on the attribute values of the expertise attribute, and vice versa. Because the linear equations may be defined recursively, the ranking system solves the linear equations by iteratively calculating the attribute values of each linear equation until the attribute values converge on a solution. After solving the linear equations, the ranking system may rank the data objects based on attribute values. For example, the ranking system may rank web pages based on their authority attribute values.

The ranking system represents the attribute values for objects based on the intra-type and inter-type relationships of the objects. The value of an attribute may be represented by the following equation:

$$F_i = F_i R_i + \Sigma_{j \neq i} F_j R_{ji}$$

where $F_i$ represents the attribute value associated with object i, $R_i$ represents the intra-type relationships between objects of the type of the object i, and $R_{ji}$ represents the inter-type relationships between objects of the type of the object i and other types j. If there are two types of objects $x = \{x_1, x_2, \ldots x_m\}$ and $y = \{y_1, y_2, \ldots y_n\}$, then their intra-type relationships can be represented as $R_X$ and $R_Y$ and their inter-type relationships can be represented by $R_{XY}$ and $R_{YX}$. The ranking system uses adjacency matrices to represent the relationship information. $L_X$ and $L_Y$ represent the adjacency matrices of the intra-type relationships within set X and Y, respectively. $L_{XY}$ and $L_{YX}$ represent the adjacency matrix of inter-type relationships from objects in X to objects in Y and the adjacency matrix of inter-type relationships from objects in Y to objects in X, respectively. The ranking system represents the adjacency matrix by the following:

$$L_{XY}(i, j) = \begin{cases} 1 & \text{if there is a relationship from object } x_i \text{ to object } y_j \\ 0 & \text{otherwise} \end{cases}$$

where $L_{XY}(i,j)$ indicates whether a relationship (also referred to as a "link") exists from object i in set X to object j in set Y. The linear equations for the attribute values can be represented as the following equations:

$$w_y = L_y^T w_y + L_{xy}^T w_x$$

$$w_x = L_x^T w_x + L_{yx}^T w_y \quad (1)$$

where $w_x$ is the attribute vector of objects in X and $w_y$ is the attribute vector of objects in Y. Equation 1 can be generalized to the following form:

$$w_M = L_M^T w_M + \sum_{\forall N \neq M} L_{NM}^T w_N \quad (2)$$

where M represents the matrix of attribute vectors.

Because mutually reinforcing relationships between objects may give undue attribute values to objects, the ranking system may normalize the binary adjacency matrices in such a way that if an object is related to n other objects in one adjacency matrix, then each related-to object gets $1/n^{th}$ of its attribute value. The ranking system may also introduce the random surfer model of PageRank to simulate random relationships and thus avoid sink nodes during computation as described below. In addition, since attributes from different types may have different importance to each other attribute, the ranking system may use weights for each combination of types. Thus, the ranking system may factor in the normalization, the random surfer model, and the weights to represent the attribute values by the following equation:

$$w_M = \alpha_M L_M'^T w_M + \beta_{NM} \sum_{\forall N \neq M} L_{NM}'^T w_N \quad (3)$$

where $$\alpha_M + \sum_{\forall N \neq M} \beta_{NM} = 1; \alpha_M > 0 \beta_{NM} > 0;$$

$$L_M' = \varepsilon U + (1-\varepsilon) L_M; 0 < \varepsilon < 1;$$

$$L_{NM}' = \delta_N U + (1-\delta_N) L_{NM}; 0 < \delta_N < 1.$$

where U is a transition matrix of uniform transition probabilities ($u_{ij}=1/n$ for all i, j; where n is the total number of objects in data space N), $L_M$ and $L_{NM}$ are normalized adjacency matrices, $\delta$ and $\epsilon$ are smoothing factors used to simulate random relationships in matrices $L_M$ and $L_{NM}$, and $\alpha_M$ and $\beta_{NM}$ represent the weights of the relationships. The ranking system iteratively calculates Equation 3 until it converges. Equation 3 can be represented by a unified square matrix A that is represented by the following equation:

$$A = \begin{vmatrix} \alpha_1 L_1' & \beta_{12} L_{12}' & \cdots & \beta_{1n} L_{1n}' \\ \beta_{21} L_{21}' & \alpha_2 L_2' & \cdots & \beta_{2n} L_{2n}' \\ \vdots & \vdots & \ddots & \vdots \\ \beta_{n1} L_{n1}' & \beta_{n2} L_{n2}' & \cdots & \alpha_n L_n' \end{vmatrix} \quad (4)$$

Matrix A has $L_M'$ on the diagonal, and $L_{NM}'$ in other parts of the unified matrix. The ranking system uses an iterative approach to transform the vector w, which is the attribute vector of all the data objects in different data spaces, using matrix A (e.g., $w=A^T w$). When the iterations converge, vector w is the principal eigenvector of matrix A.

When M and N are heterogeneous data spaces, the ranking system uses a random relationship to represent no relationship. When an object in M has no linking relationship to any objects in N, then the sub-matrix $L'_{NM}{}^T$ will be zero and will represent a "sink node" to which the calculations may assign all the attribute value. To prevent this, the ranking system sets all the elements in the corresponding row of the sub-matrix $L'_{NM}{}^T$ to $1/n$, where n is the total number of objects in data space N. Alternatively, the ranking system can set the corresponding weights to 0 for undesired intra-type and inter-type relationships. However, if $\beta_{MN}$ is greater than 0, then $\beta_{NM}$ needs to be greater than 0 if the iterative calculations are to converge. Thus, if the relationship of $L'_{NM}{}^T$ is undesired, the ranking system sets $\beta_{NM}$ to a very small positive weight to reduce the effect of $L'_{NM}{}^T$.

By constructing a unified matrix using all the adjacency matrices, the ranking system constructs a unified data space, which contains different types of objects. Thus, previous inter-type relationships can be considered as intra-type relationships in the unified space, and the ranking system effectively results in link analysis in a single data space.

FIG. 1 is a flow diagram that illustrates components of the ranking system in one embodiment. The ranking system 110 is connected to various web sites 101 via communications link 102. The ranking system includes a rank objects component 111 that invokes a collect objects component 112, an establish relationships component 113, a calculate scores component 114, and an order objects component 115 to rank objects. The rank objects component may receive a set of web pages and rank the web pages based on intra-type and inter-type relationships. The collect objects component retrieves relationship information relating to objects of various types. For example, the collect objects component may access the web logs of the web sites to identify which users access which web pages. The establish relationships component creates the intra-type and inter-type relationship matrices. For example, a relationship matrix may map users to the web pages that they access. The calculate scores component recursively calculates the attribute values using Equation 3 until the attribute values converge on a solution. The order objects component sorts the data objects based on the attribute values. For example, the order objects component may use the value of the authority attribute for a web page to sort the web pages.

The computing device on which the ranking system is implemented may include a central processing unit, memory, input devices (e.g., keyboard and pointing devices), output devices (e.g., display devices), and storage devices (e.g., disk drives). The memory and storage devices are computer-readable media that may contain instructions that implement the ranking system. In addition, the data structures and message structures may be stored or transmitted via a data transmission medium, such as a signal on a communications link. Various communications links may be used, such as the Internet, a local area network, a wide area network, or a point-to-point dial-up connection.

The ranking system may be implemented in various operating environments. Various well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
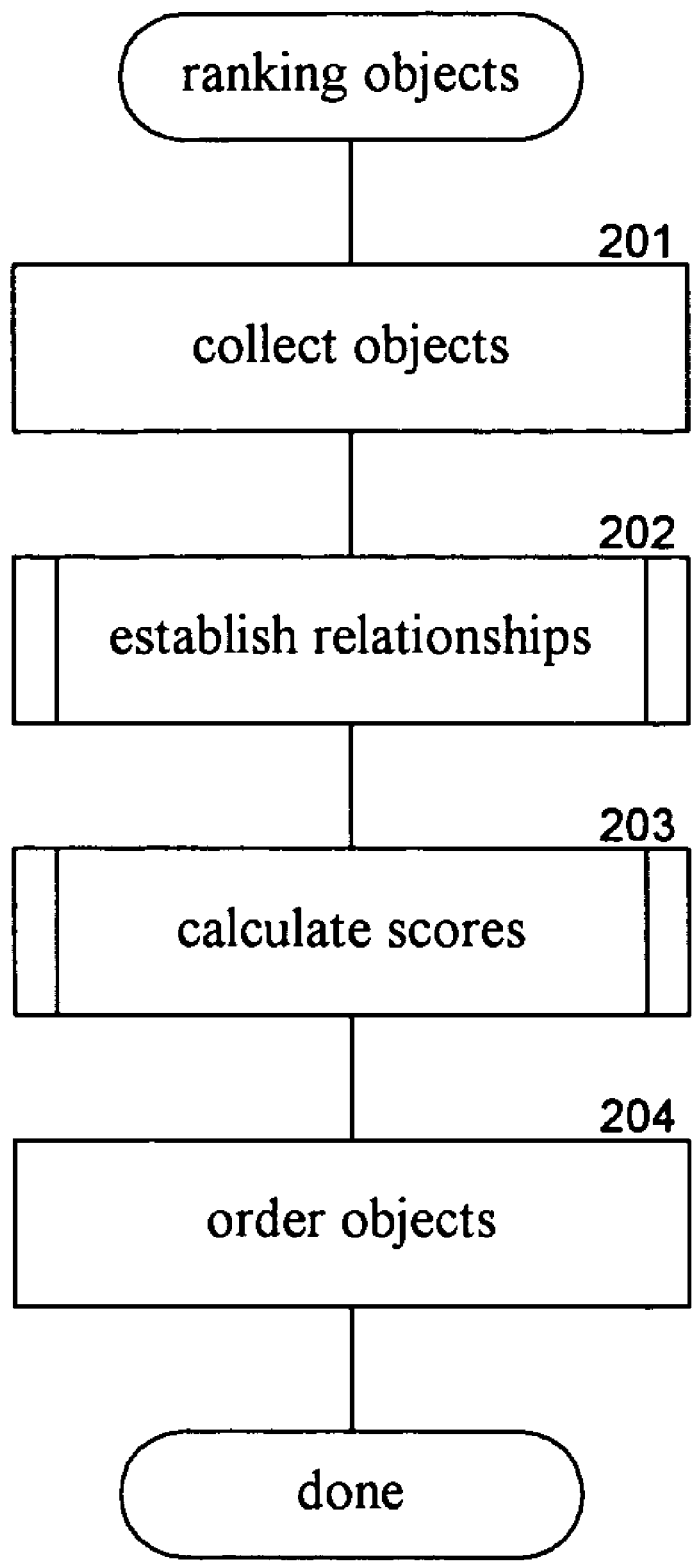
FIG. 2 is a flow diagram that illustrates the processing of the rank objects component in one embodiment.

FIG. 2 is a flow diagram that illustrates the processing of the rank objects component in one embodiment. The component collects object information, establishes relationships between the objects, calculates attribute values for the objects, and orders objects based on the attribute. In block 201, the component collects information relating to the various objects. In block 202, the component invokes the establish relationships component to generate the adjacency matrices. The establish relationships component may also retrieve and adjust the α and β weights. In block 203, the component invokes the calculate scores component to iteratively calculate the attribute values until they converge on a solution. In block 204, the component orders the data objects based on the value of an attribute. For example, the component may order web pages based on the authority attribute.

Figure 3:
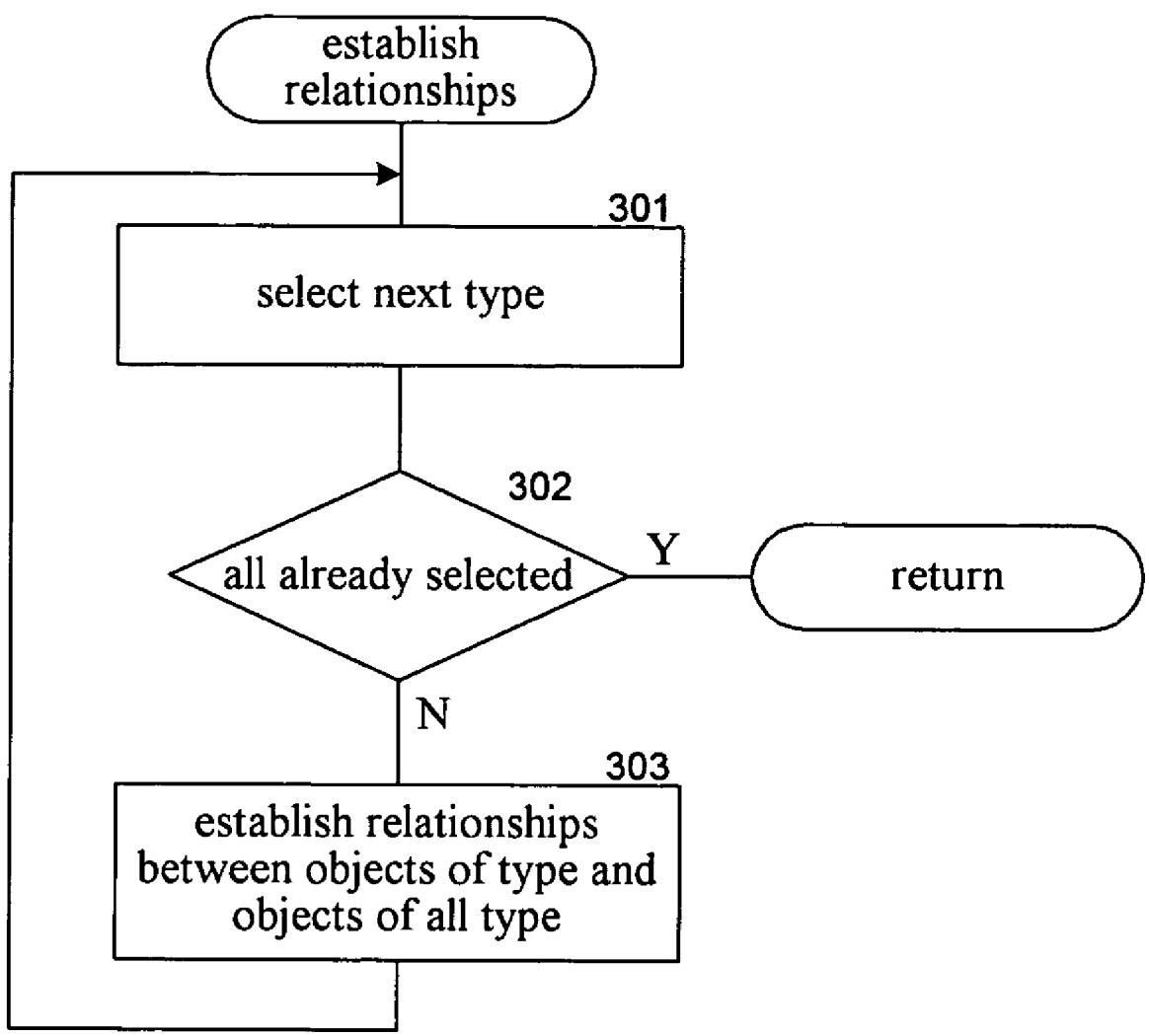
FIG. 3 is a flow diagram that illustrates the processing of the establish relationships component in one embodiment.

FIG. 3 is a flow diagram that illustrates the processing of the establish relationships component in one embodiment. In blocks 301–303, the component loops establishing the adjacency matrices for each type. In block 301, the component selects the next type. In decision block 302, if all the types have already been selected, then the component returns, else the component continues at block 303. In block 303, the component establishes the relationships between the objects of the selected type and the objects of all the types. For example, the component will establish the relationship between the authority type and the hub type, and the authority type and the expertise type. The component then loops to block 301 to select the next type.

Figure 4:
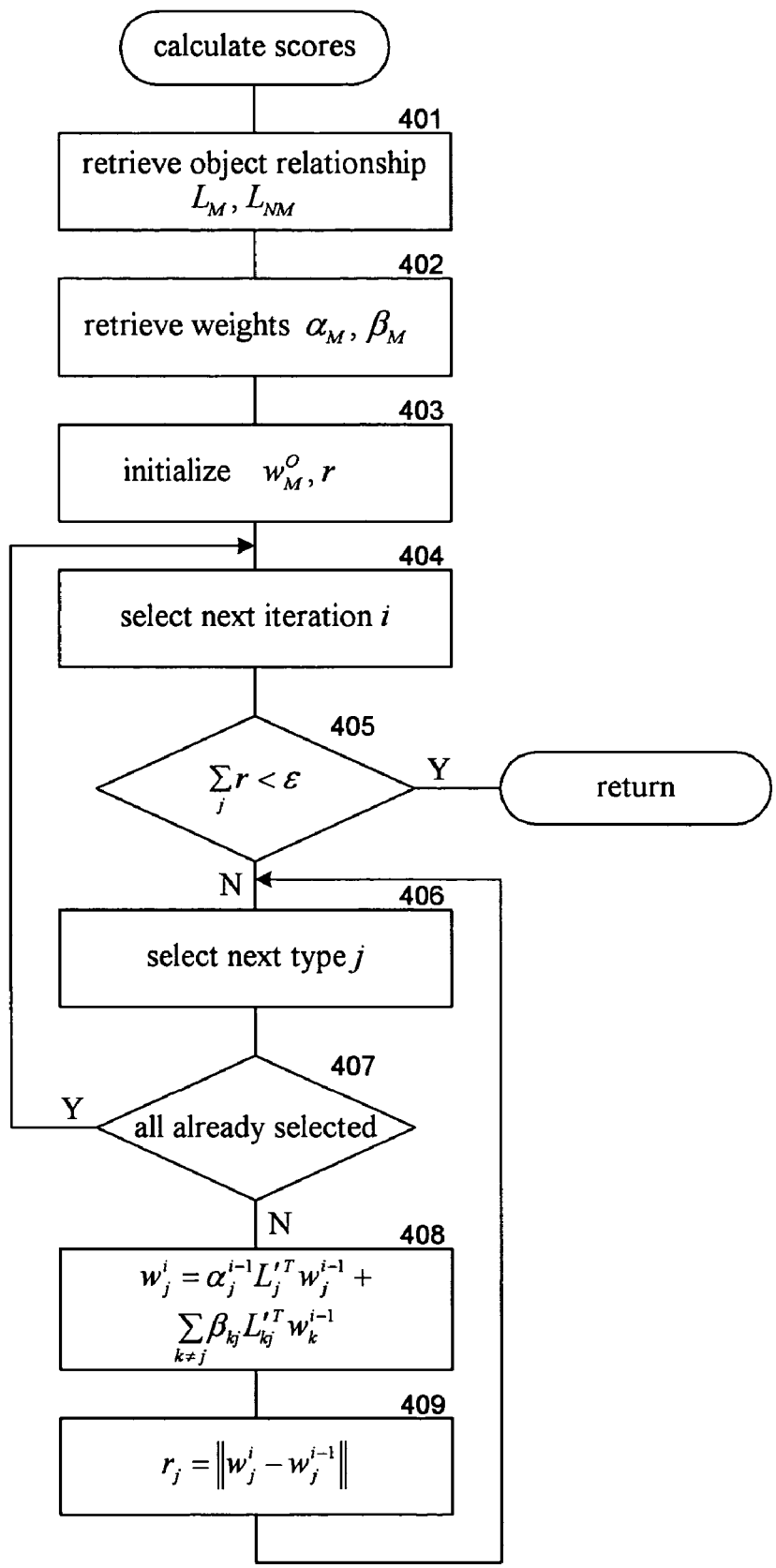
FIG. 4 is a flow diagram that illustrates the processing of the calculate scores component in one embodiment.

FIG. 4 is a flow diagram that illustrates the processing of the calculate scores component in one embodiment. The component iteratively calculates the equations until the attribute values converge. In block 401, the component retrieves the object relationships represented by the adjacency matrices. In block 402, the component retrieves the weights α and β for the intra-type and inter-type relationships. In block 403, the component initializes the vector w for each type to have an equal attribute value for each object of that type. The component may set each value to 1/m, where m is the number of objects of the type. For example, if there are 10 users, then the component sets the initial attribute values for the expertise type to 1/10. The component also initializes a difference variable for each type to a large value so that the component will initially pass the test of decision block 405. The component calculates the new value for each difference variable at the end of each iteration for determining whether the calculations have converged to a solution. In blocks 404–409, the component performs the calculations of Equation 3 until the calculations converge on a solution. In block 404, the component starts the next iteration. In decision block 405, if the sum of the differences calculated during the last iteration is less than a difference threshold, then the calculations have converged on a solution and the component returns, else the component continues at block 406. In block 406, the component selects the next type. In decision block 407, if all the types have already been selected, then the component loops to block 404 to start the next iteration, else the component continues at block 408. In block 408, the component calculates the values for the selected type based on the values calculated in the previous iteration. In block 409, the component calculates the difference between the values of this iteration and the values of the previous iteration for the selected type. The component then loops to block 406 to select the next type.

One skilled in the art will appreciate that although specific embodiments of the ranking system have been described herein for purposes of illustration, various modifications may be made without deviating from the spirit and scope of the invention. For example, one skilled in the art will appreciate that non-linear equations may be used to represent attribute values. Also, the ranking system may be used on objects of all types that have some relationship to each other. For example, the ranking system could be used to rank universities based on "importance" using relationships with students or applicants and professors, where universities, students, and professors represent objects of different types. Accordingly, the invention is not limited except as by the appended claims.

We claim:

1. A method in a computer system for determining attribute values of attributes of objects, the method comprising:
   providing types, each type having a type-specific attribute;
   identifying objects, each object associated with a type;
   for each of the types,
      identifying relationships for that type between the objects associated with that type; and
      identifying relationships for that type between an object associated with that type and an object associated with other types;
   for each of the types, calculating a value for the attribute of the object based on the identified relationships using function for each type that calculates the attribute value for that type, wherein the function is defined as $F_i = F_i R_i + \Sigma_{j \neq i} F_j R_{ji}$ where $F_i$ represents the attribute value associated with object i, $R_i$ represents intra-type relationships between objects of the type of the object i, and $R_{ji}$ represents inter-type relationships between objects of the type of the object i and other types j; and
   storing the calculated values.

2. The method of claim 1 wherein the types include an authority type, a hub type, and a expertise type.

3. The method of claim 2 wherein the relationship for objects of the authority type is based on whether a web page has a link to another web page.

4. The method of claim 3 wherein the relationship between an object of the authority type and an object of the expertise type is based on access by a user to a web page.

5. The method of claim 2 wherein the relationship for objects of the hub type is based on whether a web page has a link to another web page.

6. The method of claim 5 wherein the relationship between an object of the hub type and an object of the expertise type is based on access by a user to a web page.

7. The method of claim 1 wherein the relationships between objects of the same type are intra-type relationships.

8. The method of claim 1 wherein the relationships between objects of different types are inter-type relationships.

9. The method of claim 1 including ranking objects of a type based on their attribute values.

10. The method of claim 1 including providing an equation for each type that defines the attribute values of the type.

11. The method of claim 10 wherein the calculating includes iteratively solving the equations.

12. The method of claim 10 wherein the equations are defined recursively based on attribute values of other equations.

13. A method in a computer system for determining attribute value of object, the method comprising:
   providing a function that calculates attribute values for a type-specific attribute for objects of a type based on relationships between objects of that type and objects of another type that have another type-specific attribute, wherein the provided function calculates the attribute values also based on relationships between objects of that type and wherein the function is defined as $F_i = F_i R_i + \Sigma_{j \neq i} F_j R_{ji}$ where $F_i$ represents the attribute value associated with object i, $R_i$ represents intra-type relationships between objects of the type of the object i and $R_{ji}$ represents inter-type relationships between objects of the type of the object i and other types j;

receiving data specifying relationships between the objects of that type and objects of the other type;

calculating the provided function to determine the attribute values of the objects of that type; and storing the determined attribute values.

14. The method of claim 13 including providing a function for calculating the attribute values for the type-specific attribute for objects of the other type.

15. The method of claim 14 wherein the functions are recursively defined.

16. The method of claim 15 wherein the calculating includes iteratively calculating each function until the attribute values converge on a solution.

17. The method of claim 15 wherein the functions represent linear equations.

18. A computer-readable storage medium containing instructions for controlling a computer system to determine attribute values of objects, by a method comprising:

providing a first function that calculates attribute values for a first type-specific attribute for objects of a first type based on relationships between objects of the first type and objects of a second type that have second type-specific attribute;

providing a second function that calculates attribute values for the second type-specific attribute for objects of the second type;

receiving data specifying relationships between the objects of the first type and objects of the second type;

calculating the provided functions that determines the attribute values of the objects of the first type and the second type; and storing the determined attribute values wherein the functions are defined as $$F_i = F_i R_i + \Sigma_{j \neq i} F_j R_{ji}$$

where $F_i$ represents the attribute value associated with object i, $R_i$ represents intra-type relationships between objects of the type of the object i, and $R_{ji}$ represents inter-type relationships between objects of the type of the object i and other types j.

19. The computer-readable storage medium of claim 18 wherein the second function calculates the attribute values based on a relationship between objects of the second type.

20. The computer-readable storage medium of claim 18 wherein the first function further calculates the attribute values based on a relationship between objects of the first type.

21. The computer-readable storage medium of claim 18 wherein the second function calculates attribute values based on the attribute values of the object of the first type.

22. The computer-readable storage medium of claim 18 wherein the functions are recursively defined.

23. The computer-readable storage medium of claim 22 wherein the calculating includes iteratively calculating each function until the attribute values converge on a solution.

24. The computer-readable storage medium of claim 18 wherein the functions represent linear equations.

25. A method in a computer system for determining attribute values of attributes of objects, the method comprising:

providing types, each type having a type-specific attribute;

identifying objects, each object associated with a type;

for each of the types,
identifying relationships for that type between the objects associated with that type; and
identifying relationships for that type between an object associated with that type and an object associated with other types;

for each of the types, calculating a value for the attribute of the object based on the identified relationships using a function for each type that calculates the attribute value for that type, wherein the function is $$w_M = \alpha_M L_M^{\prime T} w_M + \beta_{NM} \sum_{\forall N \neq M} L_{NM}^{\prime T} w_N.$$

and storing the calculated values.

26. The method of claim 25 wherein the types include an authority type, a hub type, and a expertise type.

27. The method of claim 26 wherein the relationship for objects of the authority type is based on whether a web page has a link to another web page.

28. The method of claim 27 wherein the relationship between an object of the authority type and an object of the expertise type is based on access by a user to a web page.

29. The method of claim 26 wherein the relationship for objects of the hub type is based on whether a web page has a link to another web page.

30. The method of claim 29 wherein the relationship between an object of the hub type and an object of the expertise type is based on access by a user to a web page.

31. The method of claim 25 wherein the relationships between objects of the same type are intra-type relationships.

32. The method of claim 25 wherein the relationships between objects of different types are inter-type relationships.

33. The method of claim 25 including providing an equation for each type that defines the attribute values of the type.

34. The method of claim 33 wherein the calculating includes iteratively solving the equations.

35. The method of claim 33 wherein the equations are defined recursively based on attribute values of other equations.

* * * * *